UNITED STATES PATENT OFFICE.

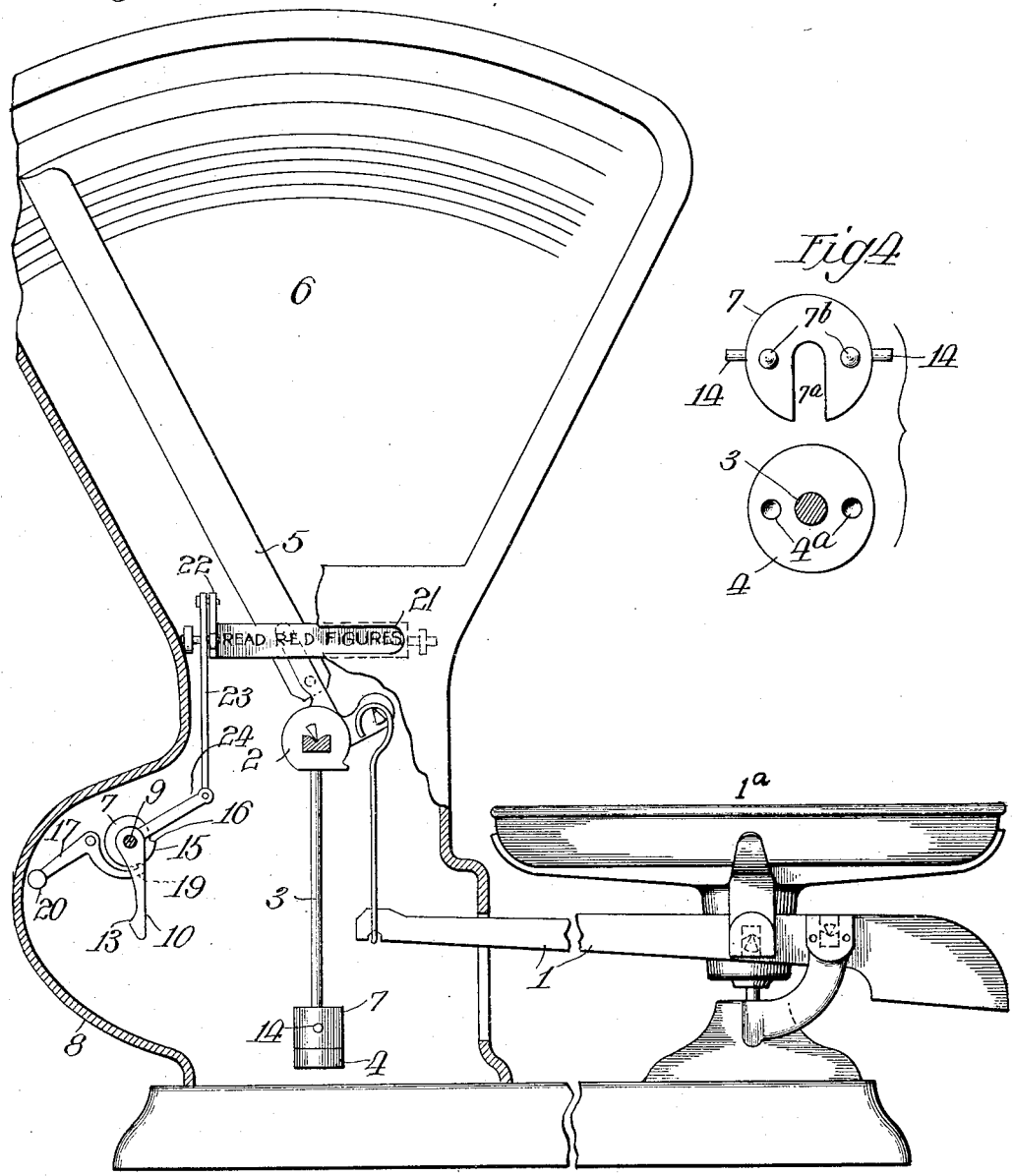

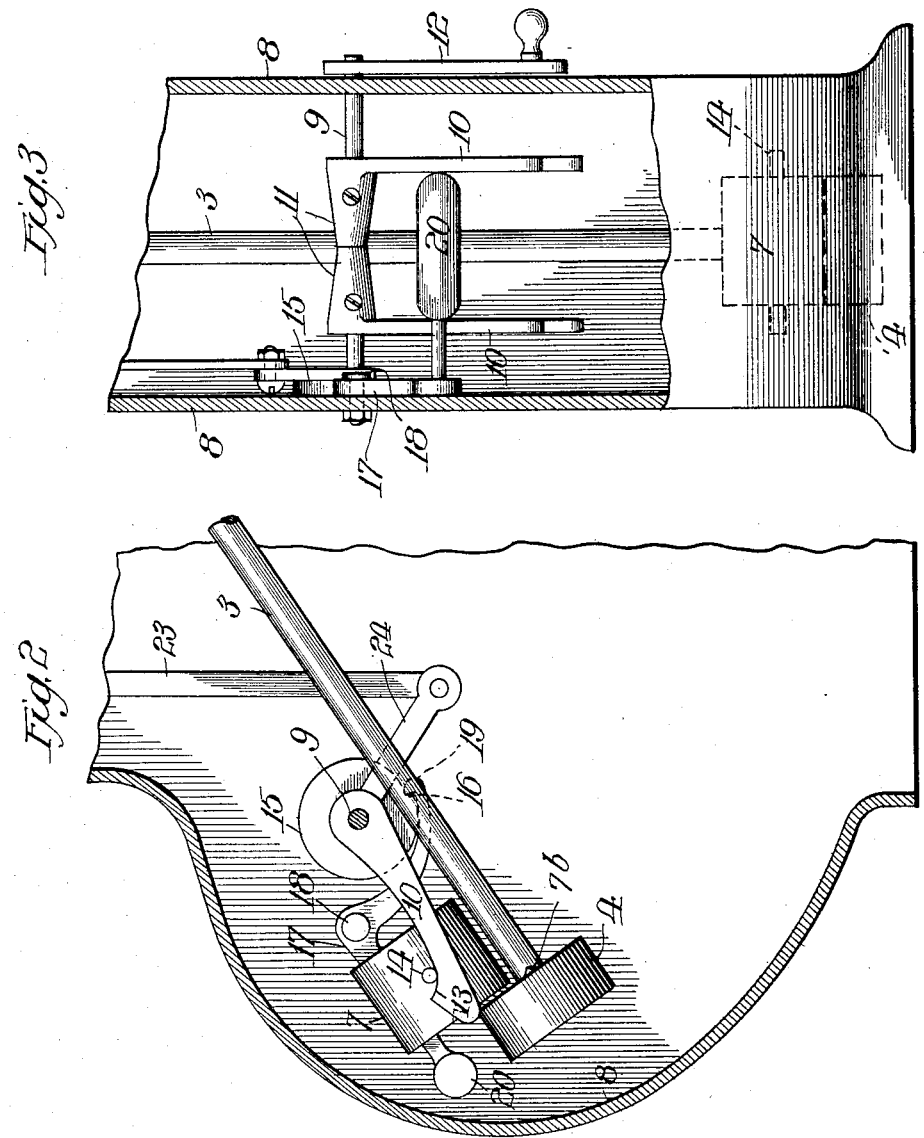

FRANK F. WEAR, OF SAN FRANCISCO, CALIFORNIA, ASSIGNOR, BY MESNE ASSIGNMENTS, TO TOLEDO SCALE COMPANY, OF NEWARK, NEW JERSEY, A CORPORATION OF NEW JERSEY.

SCALE.

1,162,836.  Specification of Letters Patent.  Patented Dec. 7, 1915.

Application filed May 23, 1904. Serial No. 209,395.

*To all whom it may concern:*

Be it known that I, FRANK F. WEAR, a citizen of the United States, residing at San Francisco, San Francisco county, California, have invented certain new and useful Improvements in Scales, of which the following is a specification.

My invention pertains to computing scales, more particularly those of the pendulum type, in which an extra or additional weight or ball is adapted to be placed on the pendulum rod, to operate in connection with the usual and permanent pendulum weight and thereby increase the range and capacity of the scale.

The object of my invention is to provide means for readily and conveniently attaching and detaching the removable weight both by hand and in an automatic manner, as hereinafter made apparent.

In the drawings, Figure 1 is a side elevation of a scale embodying my invention with a portion broken away to expose the new parts; Fig. 2 an enlarged detail view of such new parts; Fig. 3 an end view of such parts, and Fig. 4 a detail view of the regular pendulum weight and the supplemental or removable weight.

The particular form of pendulum scale is not material, inasmuch as my invention may be applied to any of those in common and well known use, and hence no detailed description of the scale is necessary. It will suffice to say that the scale beam or lever 1, on which is pivoted a suitable load platform 1ª, is operatively connected with the disk 2 from which depends the pendulum rod 3 having the permanent pendulum weight 4, and from which extends the usual pointer or hand 5 arranged to sweep over the price-computing table or chart 6.

As shown in Fig. 1, the pendulum is provided with the extra or removable pendulum weight 7, so that the scale is now capable of weighing and computing according to its increased capacity, and the object of my invention is to provide means for the attachment and detachment of such removable weight without the necessity of the actual handling of the weight by the operator, with consequent inconvenience and liability of slight misplacement of the removable weight, which might prevent accurate weighing and computing.

It will be understood that provision is made for the different readings accordingly as the removable weight is in use or not, and, as usual in such cases, I provide on the chart and pointer black figures to be read when only the permanent pendulum weight is used, and red figures when both weights are used. Likewise the removable weight may be painted a contrasting color, such as red, to distinguish it from the other weight which may be painted black.

Extending transversely and journaled in the walls 8 of the scale casing is a rock shaft 9, from which depend two similar arms 10 having hubs 11 secured to the shaft. This shaft projects through the front wall of the scale casing and is there provided with an operating handle 12 within easy reach of the operator. These arms 10 are provided toward their outer ends with cam surfaces 13 which are adapted to engage and coöperate with opposite and laterally projecting pins or studs 14 on the removable weight or ball 7. These arms serve as a cradle or supporting frame for such removable weight in a manner and for a purpose hereinafter made apparent.

Upon the rock shaft 9 and toward one end thereof is secured a disk 15 having a cam surface terminating in a shoulder 16 adapted to be engaged and held, under certain conditions, by a lever or latch 17. This latch is pivoted at 18 to the rear wall of the scale casing, and its inner or upper end 19 is hook-shaped so as to engage the shoulder of the disk. This latch or lever has a trip arm 20 extending laterally at right angles in the path of swing of the permanent pendulum weight when swung slightly above or beyond its usual travel, particularly when swung quickly and somewhat violently, as when the normal capacity of the scale has been exceeded. Now, assuming that the removable weight is in its normal position resting in the cradle, as seen in Fig. 2, and it is desired to transfer or attach the same to the pendulum rod on top of the permanent weight in order to increase the capacity of the scale, the operator depresses the scale beam to such extent that the permanent weight will strike against the trip arm and move the same and consequently the lever 17 sufficiently to release the hook 19 from its engagement with the rock shaft, with the result that the cradle will be free to drop downward to the position indicated in Fig. 1 and deposit its weight onto the permanent weight on the pendulum rod. It will be understood that the removable weight has a side opening 7ª as seen in Fig. 4 to accommodate the pendulum rod and also has sockets 7ᵇ to receive upwardly projecting pins 4ª on the permanent weight, so that the removable weight will always be properly positioned on the permanent weight to assure correct weighing and computing. It is evident that the action or operation of attaching or transferring the removable weight to the pendulum as just above explained, may be automatic and independent of the action of the operator in depressing the scale beam to full extent, for, in case there is placed on the scale platform or pan a load whose weight exceeds the capacity of the scale, the pendulum will be swung upwardly in such manner as to cause the transfer of the weight automatically and in the described manner, with the result that the range or capacity of the scale is increased so as to properly weigh and compute the value of the load or article. When it is desired to remove the extra weight and thereby restore the scale to its original or normal capacity, the operator first depresses the scale beam by pressing down on the platform or otherwise, and then, by turning the lever 12 in the proper direction, rocks the shaft 9 so as to bring its cradle below the removable weight and, by continued upward movement, to lift the same from the pendulum rod. When the cradle has been rocked to the position shown in Fig. 2, the latch 19 engages the disk 15 and the cradle is thereby held in elevated position. The office of the cam faces 13 on the cradle arms is to lift the removable weight bodily from the permanent weight in a direction longitudinal of the pendulum so as to raise such removable weight sufficiently to clear the points or pins 4ª of the permanent weight.

As hereinbefore stated contrasting colors such as black and red are employed for the weight and price figures accordingly as the scale is weighing and computing at normal or increased capacity, and in order that the operator may tell at a glance which figures to read (and consequently whether the removable weight is on the pendulum or not) I provide a rocking shutter or sign 21 arranged within the scale casing below the chart 6 and exposed through a sight opening in the walls 8 thereof. This sign is mounted within the casing in suitable manner and provided on one side with the words or directions "Read black figures" and on the other side with the words "Read red figures," so that the operator may readily know by observing the sign which figures of the chart to read. This sign is adapted to be rocked to expose one or the other of its sides and to be governed by the rock shaft 9, to which end such sign has a crank arm 22 connected by a link 23 with an arm 24 projecting from and movable with the rock shaft. This arm 24 moves in a vertical plane and when in its uppermost position the removable weight is in action and the sign is turned to expose the words "Read red figures," as indicated in Fig. 1. When, however, the removable weight is in its suspended position in the cradle, the arm 24 is in its lowermost position, in which event the sign or shutter 21 is turned to expose its other side with the words "Read black figures."

By my improvement the range or capacity of the machine may be readily and quickly increased by the operator by the mechanism described without the necessity of his handling the removable weight, besides which the fact as to the range or capacity of the scale at any time is indicated to the operator. Moreover, the arrangement is such that the scale automatically increases its capacity whenever a load greater than its normal capacity is placed on the platform.

I claim:

1. In a pendulum scale, the combination with the pendulum and indicating devices, of an auxiliary weight, and means for automatically depositing the same on the pendulum establishing and maintaining at will an augmented counter-balancing property therein.

2. In a pendulum scale, in combination with a pendulum and indicating devices, a removable weight arranged to be placed automatically on said pendulum and means under the control of the operator for removing it therefrom; substantially as described.

3. In a pendulum scale, in combination with a pendulum and indicating devices, a removable weight arranged to be placed automatically on said pendulum and manually operated means for removing it therefrom; substantially as described.

4. In a pendulum scale, in combination with a pendulum and indicating devices, a removable weight, and means controlled by the movements of the pendulum for transferring such weight to the pendulum to increase the capacity of the scale; substantially as described.

5. In a pendulum scale, in combination with a pendulum and indicating devices, a removable weight, means controlled by the movements of the pendulum for transferring such weight to the pendulum, and by manual operation for removing such weight therefrom; substantially as described.

6. In a pendulum scale, in combination with a pendulum and indicating devices, a removable weight, and means for normally holding the weight and controlled by the movements of the pendulum for transferring such weight from its normal position to an operative position on the pendulum; substantially as described.

7. In a pendulum scale, in combination with a pendulum and indicating devices, a removable weight, means for normally holding such weight in a suspended position in the path of travel of the pendulum and controlled by the movements of such pendulum to transfer the weight thereto when such pendulum swings to its full limit; substantially as described.

8. In a pendulum scale, in combination with a pendulum and indicating devices, a removable weight, a swinging frame for normally retaining such weight and controlled by an abnormal movement of the pendulum to transfer the weight thereto; substantially as described.

9. In a pendulum scale, in combination with a pendulum and indicating devices, a removable weight, a swinging frame for normally holding such weight in a suspended position and means arranged to lock such frame in normal position and controlled by the movements of the pendulum; substantially as described.

10. In a pendulum scale, in combination with a pendulum and indicating devices, a removable weight and a swinging frame having arms between which the weight is normally held, said frame being controlled by an abnormal movement of the pendulum to transfer the weight thereto when the pendulum swings to its full limit; substantially as described.

11. In a pendulum scale, in combination with a pendulum and indicating devices, a removable weight, a swinging frame having arms between which the weight is normally held in the path of movement of the pendulum, and a lock for holding the frame in normal position and arranged to be operated by the pendulum; substantially as described.

12. In a pendulum scale, in combination with a pendulum and indicating devices, a removable weight, a swinging frame for normally holding such weight in a suspended position and arranged to transfer it to the pendulum, a lock for holding the frame in normal position, and a tripping arm operatively connected with such lock and actuated by the pendulum in its full or extreme swing; susbtantially as described.

13. In a pendulum scale, in combination with a pendulum and indicating devices, a removable weight, a swinging frame for normally holding such weight in a suspended position and arranged to transfer it to the pendulum, a rock shaft on which the frame is mounted, a disk on the shaft, and a lock or latch coöperating with such disk to lock it and the frame in normal position and actuated by the pendulum; substantially as described.

14. In a pendulum scale, in combination with a pendulum and indicating devices, a removable weight, a swinging frame for normally holding such weight in a suspended position and arranged to transfer it to the pendulum, a rock shaft on which the frame is mounted, a disk mounted on the shaft and having an engaging shoulder 16, and a lock or latch adapted to engage such shoulder and actuated by the pendulum; substantially as described.

15. In a pendulum scale, in combination with a pendulum and indicating devices, a removable weight, a swinging frame for normally holding such weight in a suspended position and arranged to transfer it to the pendulum, a rock shaft on which the frame is mounted, a disk mounted on the shaft and a pivoted lock or latch controlled by the pendulum and arranged to coöperate with the disk to hold the frame in normal position; substantially as described.

16. In a pendulum scale, in combination with a pendulum and indicating devices, a removable weight, a swinging frame for normally holding such weight in a suspended position and arranged to transfer it to the pendulum, a rock-shaft on which the frame is mounted, a disk mounted on the shaft and having an engaging shoulder 16, and a pivoted latch controlled by the pendulum and arranged to coöperate with said shoulder; substantially as described.

17. In a pendulum scale, in combination with a pendulum and indicating devices, a removable weight, a swinging frame for normally holding such weight in a suspended position and arranged to transfer it to the pendulum, a rock shaft on which the frame is mounted, a disk mounted on the shaft, a pivoted latch coöperating with the disk to lock it in normal position, and a trip arm connected with the latch and extending into the path of extreme movement of the pendulum to be tripped thereby; substantially as described.

18. In a pendulum scale, in combination with a pendulum and indicating devices, a removable weight, a swinging frame for normally holding such weight in a suspended position and arranged to transfer it to the pendulum, a rock shaft on which the frame is mounted, means for locking the frame in normal position and controlled by the movements of the pendulum, and a handle secured to the rock shaft to restore the frame to normal position; substantially as described.

19. In a pendulum scale, in combination with a pendulum and indicating devices, a removable weight, said weight having lateral pins 14 a swinging frame for normally holding such weight in a suspended position and arranged to transfer it to the pendulum, said frame comprising a pair of arms forming a cradle for the weight and having, near their outer ends, cam surfaces 13 coöperating with said pins to give the weight a longitudinal movement when removing it from the pendulum, and means for manually swinging the frame back to normal position; substantially as described.

20. In a pendulum scale, in combination with a pendulum and indicating devices, a removable weight, said weight having a side slot to receive the pendulum, and a swinging frame for normally holding such weight in a suspended position and arranged to transfer it to the pendulum and controlled by an abnormal movement of such pendulum; substantially as described.

21. In a pendulum scale, in combination with a pendulum and indicating devices, a removable weight, a swinging frame controlled by the movements of the pendulum for automatically transferring the weight thereto, and means controlled by the movements of such frame to indicate whether the weight is on or off the pendulum; substantially as described.

22. In a pendulum scale, in combination with a pendulum and indicating devices, a removable weight, mechanism normally supporting the weight and arranged to move and thereby transfer the weight to or remove it from the pendulum, a reversible indicator and means controlled by the movements of such mechanism to operate said indicator for showing whether the weight is on or off the pendulum; substantially as described.

23. In a pendulum scale, the combination with a pendulum and indicating devices, a removable weight, mechanism normally supporting the weight and arranged to move and thereby transfer the weight to or remove it from the pendulum, and a pivoted indicator controlled by the movements of said mechanism to indicate whether the weight is on or off; substantially as described.

24. In a pendulum scale, in combination with a pendulum and indicating devices, a removable weight, mechanism normally supporting the weight and arranged to move and thereby transfer the weight to or remove it from the pendulum, a pivoted reversible indicator to indicate whether the weight is on or off, and an operating link between the indicator and the said mechanism; substantially as described.

25. In a pendulum scale, in combination with a pendulum and indicating devices, a removable weight, a swinging frame for normally holding such weight and arranged to transfer it to the pendulum when the latter swings beyond its weighing limit, a rock shaft on which the frame is mounted, and an indicator operatively connected with said shaft for indicating whether the weight is on or off; substantially as described.

26. In a pendulum scale, in combination with a pendulum and indicating devices, a removable weight, a swinging frame for normally holding such weight in a suspended position and arranged to transfer it to the pendulum, a rock shaft on which the frame is mounted, a pivoted sign or indicator for indicating whether the weight is on or off, a crank arm 22 on such sign, a link 23 connected to said arm, and an actuating arm 24 on the shaft for operating the link 23; substantially as described.

27. In a pendulum scale, in combination with a pendulum and indicating devices, a removable weight adapted to be applied to the depending portion of the pendulum, and mechanism normally supporting the weight entirely free from the pendulum and arranged to transfer it automatically to the pendulum; substantially as described.

28. In a pendulum scale, the combination with the pendulum, of means for automatically augmenting the counter-balancing property thereof by a movement of the pendulum beyond its weighing limit and maintaining the augmentation at will.

29. In a pendulum scale, the combination with the pendulum, of means for automatically augmenting the counter-balancing property thereof through the swing of the pendulum and maintaining the augmentation at will.

30. In a pendulum scale, and in combination with the beam and weight indicator thereof, of a pendulum connected to the beam and adapted and arranged to swing beyond its normal weighing limit, a removable weight adapted to be carried thereby, and means located beyond and near the end of the normal limit of the pendulum swing adapted to remove said weight from the pendulum only when the latter is moved beyond its normal swing.

31. In a pendulum scale, and in combination with the beam and movable weight indicator thereof, of a pendulum connected to the beam and adapted to move beyond the end of its normal swing, of a removable weight adapted to be carried by the pendulum to augment its capacity, and means located beyond and near the end of the normal swing of the pendulum adapted to deposit the weight upon the pendulum and remove it therefrom only when the pendulum moves beyond its normal swing.

32. In a pendulum scale, the combination with the beam and indicator, of a pendulum movable to a point beyond that to which it swings when the scale is loaded to its full weighing capacity and a removable weight adapted to be carried by the pendulum to increase the capacity of the latter, and means located beyond and near the end of the normal swing of the pendulum adapted to deposit said weight upon the pendulum only when the latter is swung beyond its weighing limit.

33. In a pendulum scale, in combination with a pendulum and indicating devices, a removable weight arranged to coöperate with the pendulum, a swinging frame having arms between which the weight is supported and arranged to deposit such weight on the pendulum and remove it therefrom, and means for swinging said frame.

34. In a pendulum scale, in combination with a pendulum and indicating devices, a removable weight arranged to coöperate with the pendulum, mechanism for placing such weight on the pendulum and removing it therefrom, and means controlled by the movements of such mechanism to indicate whether the weight is on or off the pendulum.

35. In a pendulum scale, in combination with a pendulum and indicating devices, a removable weight arranged to coöperate with the pendulum, a swinging frame for supporting such weight and arranged to deposit the same on the pendulum and remove it therefrom, and an indicator controlled by the movements of the frame to indicate whether the weight is on or off the pendulum.

36. In a pendulum scale, in combination with a pendulum and indicating devices, a removable weight arranged to coöperate with the pendulum, a swinging frame for supporting said weight and arranged to deposit the same on the pendulum and remove it therefrom, and a pivoted indicator controlled by the movements of the frame to indicate whether the weight is on or off the pendulum.

37. In a pendulum scale, in combination with a pendulum and indicating devices, a removable weight arranged to coöperate with the pendulum, a swinging frame for supporting such weight and arranged to deposit the same on the pendulum, a pivoted indicator having indications thereon to show whether the weight is on or off the pendulum, and an operating rod between the frame and indicator.

38. In a pendulum scale, in combination with a pendulum and indicating devices, a removable weight arranged to coöperate with the pendulum, a swinging frame for placing the weight on the pendulum or removing it therefrom, a pivoted plate having indications to show whether the weight is on or off the pendulum, and a connecting link between the frame and plate pivoted eccentrically to the latter.

39. In a pendulum scale, in combination with a pendulum and indicating devices, a removable weight arranged to coöperate with the pendulum, said weight having a side slot extending to its center to receive the pendulum, and mechanism for supporting said weight arranged to deposit the same on the pendulum.

40. In a pendulum scale, in combination with a pendulum and indicating devices, a removable weight arranged to coöperate with the pendulum, said weight having a side slot extending to its center to receive the pendulum, and a swinging frame having arms extending on either side of the pendulum for supporting the removable weight and arranged to deposit it on the pendulum.

41. In a pendulum scale, in combination with a pendulum and indicating devices, a removable weight arranged to coöperate with the pendulum, said weight being provided with a side slot to receive the pendulum and having recesses in its under face and said pendulum having a permanent weight provided with points to enter said recesses of the removable weight, and mechanism for supporting said removable weight arranged to deposit the same on the permanent weight.

42. In a pendulum scale, the combination with the pendulum and its removable weight, of means for removing and replacing the latter and an index plate controlled by said means for showing whether the weight is on or off the pendulum.

43. In a pendulum scale, the combination with the pendulum and its removable weight, of a swinging carrier for removing and replacing the latter, means for operating said carrier, and an index plate controlled by said means to show whether the weight is on or off the pendulum.

44. In a pendulum scale, in combination with a pendulum and indicating devices, a removable weight arranged to coöperate with the pendulum, a swinging frame for supporting said weight and arranged to deposit the same on the pendulum, and a pivoted indicator controlled by the movements of the frame to indicate whether the weight is on or off the pendulum.

45. In a pendulum scale, in combination with a pendulum and indicating devices, a removable weight, a swinging frame for normally holding said weight in a suspended position, and means operated by the movement of the pendulum controlling the movement of the swinging frame.

46. In a weighing scale, the combination with the beam and indicator thereof, of a pendulum movable to a position beyond its weighing limit, of a removable weight adapted to be carried by the pendulum to increase its capacity, of means permanently associated with the scale movable into and out of the path of the weight when on the pendulum and adapted to deposit said weight on the pendulum and remove it therefrom only when the pendulum swings beyond its weighing limit.

47. In a pendulum scale, the combination with the beam, the pendulum and a removable weight for the latter, of means located beyond and near the end of a normal weighing swing of the pendulum adapted to releasably retain the weight upon it, and having a member adapted to be engaged by the pendulum when it swings beyond its normal course to release the weight.

FRANK F. WEAR.

Witnesses:
ALLEN DE VILBISS, Jr.,
THURBUR W. McGLONE.